United States Patent
Brown

(10) Patent No.: US 9,924,138 B1
(45) Date of Patent: Mar. 20, 2018

(54) COMBINED AIR-TURBULENCE, ICE, VOLCANIC-ASH AEROSOLS, PASSIVE LWIR OPTICAL SYSTEMS FOR CRUISING-AIRPLANE SAFETY

(71) Applicant: Robert G. Brown, Tustin, CA (US)

(72) Inventor: Robert G. Brown, Tustin, CA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 553 days.

(21) Appl. No.: 14/599,063

(22) Filed: Jan. 16, 2015

(51) Int. Cl.
 *H04N 7/18* (2006.01)
 *H04N 5/33* (2006.01)
 *G06K 9/46* (2006.01)

(52) U.S. Cl.
 CPC .............. *H04N 7/183* (2013.01); *G06K 9/46* (2013.01); *H04N 5/33* (2013.01)

(58) Field of Classification Search
 CPC ............. H04N 7/183; H04N 5/33; G06K 9/46
 See application file for complete search history.

(56) References Cited

U.S. PATENT DOCUMENTS

| | | | | |
|---|---|---|---|---|
| 5,721,427 A * | 2/1998 | White | ................. | H04N 5/3656 250/252.1 |
| 6,409,198 B1 * | 6/2002 | Weimer | .................... | G01J 5/52 250/339.01 |
| 8,492,727 B1 | 7/2013 | Brown et al. | | |
| 9,483,951 B1 * | 11/2016 | McCusker | ........... | G08G 5/0091 |
| 2003/0219150 A1 * | 11/2003 | Niles | ........................ | G06K 9/00 382/128 |
| 2004/0130714 A1 * | 7/2004 | Gellerman | ................ | G01J 3/44 356/300 |
| 2005/0029453 A1 * | 2/2005 | Allen | ........................ | G01J 5/06 250/332 |
| 2008/0197284 A1 * | 8/2008 | Ebenstein | ................. | B60R 1/00 250/330 |
| 2014/0139643 A1 * | 5/2014 | Hogasten | .......... | H01L 27/14609 348/48 |
| 2015/0019185 A1 * | 1/2015 | Cunningham | ...... | G06F 17/5009 703/6 |

OTHER PUBLICATIONS

"Correlation and Cross-Correlations". http://eprl.epfl.ch/files/content/sites/aprl/files/ENV-400/05_correlations.html.*

(Continued)

*Primary Examiner* — Samantha K Abraham
(74) *Attorney, Agent, or Firm* — Donna P. Suchy; Daniel M. Barbieri

(57) ABSTRACT

A passive thermal imaging system, includes a first detection unit, a second detection unit, imaging optics and processing electronics. The first detection unit and second detection unit each include at least one first detector array. The imaging optics are configured to image a first wavelength range of received EMR onto the at least one first detector array, and to image a second wavelength range of the received EMR onto the at least one second detector array. The processing electronics are configured to receive a first detected signal from the at least one first detector array and to determine whether a first detection event has occurred based on the first detected signal, and to receive a second detected signal from the at least one second detector array and to determine whether a second detection event and a third detection event have occurred based on the second detected signal.

19 Claims, 7 Drawing Sheets

(56) References Cited

OTHER PUBLICATIONS

U.S. Appl. No. 13/901,253, filed May 23, 2013, Brown.
U.S. Appl. No. 13/901,274, filed May 23, 2013, Brown.
U.S. Appl. No. 14/033,202, filed Sep. 20, 2013, Brown.
Connell, Detecting Volcanic Ash and blowing dust using GOES, MODIS and AIRS imagery019, 14th Conference on Satellite Meteorology and Oceanography, paper P3.8, American Meteorological Society (2006), 7 pages.
Deiemendjian, Electromagnetic Scattering on Spherical Polydispersions, American Elsevier Publishing Company, 1969, 318 pages.
Francis et al., Retrieval of physical properties of volcanic ash using Meteosat: A case study from the 2010 Eyjafjallajokull eruption, Journal of Geophysical Research, vol. 117, D00U09, doi:10.1029/2011JD016788, 2012, 14 pages.
Jakeman et al., Statistical accuracy in the digital autocorrelation of photon counting fluctuations, J. Phys A: Gen. Phys., 1971, vol. 4, 18 pages.
Kruse, Uncooled Thermal Imaging Arrays, Systems, and Applications, (SPIE Tutorial Texts in Optical Engineering vol. TT51), SPIE Publications (2001), 4 pages.
Prata, Infrared Radiative Transfer Calculations for Volcanic Ash Clouds, Geophysical Research Letters, Nov. 1989, vol. 16, No. 11, pp. 1293-1296, 4 pages.
Prata, Observations of volcanic ash clouds in the 10-12 nanometer window using AVHRR/2 data, Int. J. Remote Sensing, 1989, vol. 10, Nos. 4 and 5, 751-761, 13 pages.
Rogalski, Infrared Detectors, Chapter 14, 2nd Edition, CRC Press (2010), 62 pages.
Smith, Modern Optical Engineering, McGrw-Hill, 3rd Edition, (2000) 641 pages.
Smith, The Infrared & Electro-Optical Systems Handbook: vol. 2, 018Atmospheric Propagation of Radiation019, co-published by ERIM & SPIE (1978, 333 pages {LOWTRAN: Sec. 1.5, pp. 127 to 132}.
Sparroid et al., Refractive Lens Design for Simultaneous SWIR and LWIR Imaging, Infared Technology and Applications XXXVII, Proceedings of SPIE vol. 8012, 801224, 2011, 18 pages.

* cited by examiner

COMBINED AIR-TURBULENCE, ICE, VOLCANIC-ASH AEROSOLS, PASSIVE LWIR OPTICAL SYSTEMS FOR CRUISING-AIRPLANE SAFETY

BACKGROUND

The present invention relates an optical system for detection of clear air turbulence (CAT), high altitude ice crystals (HAIC), and volcanic ash clouds (VAC) in a three channel system.

CAT, HAIC, and VAC all may posed a threat or discomfort for aircraft in flight. For example, atmospheric ice-particles may pose a threat for engines of aircraft in flight. Ice-particles from HAIC may get into aircraft engines and attach themselves to engine surfaces, building up until ice causes engine failure in some way. The ice particles typically are present in the atmosphere in the form of ice-particle aerosols.

CAT is the turbulent movement of air masses in the absence of any visual cues such as clouds, and is caused when bodies of air moving at widely different speeds meet. The atmospheric region most susceptible to CAT is the high troposphere at altitudes of around 7,000-12,000 meters (23,000-39,000 ft) as it meets the tropopause. Here CAT is most frequently encountered in the regions of jet streams. At lower altitudes it may also occur near mountain ranges. Thin cirrus clouds can also indicate a high probability of CAT.

CAT can be hazardous to the comfort, and even safety, of air travel. The thermal characteristics of CAT are known. Studies show that gust velocity changes in CAT of at least 20 ft sec$^{-1}$ are associated with temperature changes of 3° C. or higher; very few being less than 1° C. Such studies show that CAT horizontal temperature gradients with a minimum temperature change of 2° C., and at a rate which equaled or exceeded 0.5° C. per minute. Moderately choppy CAT was observed at a 5° C. temperature change Finally, volcanic ash from VAC may also pose a threat or discomfort for aircraft in flight. VAC can appear instantaneously while an aircraft is in flight, even in the dark, and may be hazardous to aircraft flight through consequent engine failure/damage.

What is needed is an optical system for detecting CAT, HAIC and VAC in a single system.

SUMMARY OF THE INVENTION

According to one embodiment, there is provided a passive thermal imaging system, comprising: a first detection unit comprising at least one first detector array configured to detect thermal electromagnetic radiation (EMR); a second detection unit comprising at least one second detector array configured to detect thermal EMR; imaging optics configured to receive thermal EMR from an object, to pass a first wavelength range of the received thermal EMR, to image the first wavelength range of the received EMR onto the at least one first detector array, to pass a second wavelength range of the received thermal EMR, and to image the second wavelength range of the received EMR onto the at least one second detector array; and processing electronics configured to: receive a first detected signal from the at least one first detector array and to determine whether a first detection event has occurred based on the first detected signal; and to receive a second detected signal from the at least one second detector array and to determine whether a second detection event and a third detection event have occurred based on the second detected signal, wherein the first detection event corresponds to detection of clear air turbulence (CAT), the second detection event corresponds to detection of high altitude ice crystals (HAIC), and third detection event corresponds to detection of volcanic ash clouds (VAC).

According to one aspect of the invention, the processing electronics is configured to determine whether a respective one of the detection events has occurred based on determining a cross correlation of a respective one of the detected signals.

According to another aspect of the invention, determining the cross correlation comprises determining an intercept and a variance of a correlation coefficient.

According to another aspect of the invention, the processing electronics is configured to determine whether a respective one of the detection events has occurred, based on averaging a sequence of a respective one of the detected signals to reduce a false alarm rate of detecting the respective one of the detection events.

According to another aspect of the invention, a false alarm rate of detecting the first, second and third detection events is less than about $10^{-6}$.

According to another aspect of the invention, the system is configured to detect one of the detection events at an object range of up to about 200 miles.

According to another aspect of the invention, at least one of the first, second and third detection events includes detection of weather events including at least one of high winds, tornados, clouds, rain, hail, snow, or other precipitation.

According to another aspect of the invention, the processing electronics is configured to determine whether the second detection event has occurred based on negative discrimination of brightness temperature difference (BTD) of the second detected signal.

According to another aspect of the invention, the processing electronics is configured to determine whether the third detection event has occurred based on positive discrimination of brightness temperature difference (BTD) of the second detected signal.

According to another aspect of the invention, the processing electronics is configured to determine whether the third event has occurred based on two different light scattering detection techniques.

According to another aspect of the invention, the two different light scattering detection techniques include the determination of the existence of HAIC based on the ratio of two Raman shifted wavelengths, and the determination of the existence of HAIC based on positive discrimination of brightness temperature difference (BTD).

According to another aspect of the invention, the imaging optics include a first bandpass filter arranged to pass the first wavelength range of the received EMR.

According to another aspect of the invention, the system further comprises: a third detection unit comprising: a laser arranged to provide laser light to the object; and at least one third detector array arranged to receive scattered laser light from the object.

According to another aspect of the invention, the imaging optics includes spectrally selective mirrors arranged to receive the thermal EMR form the imaging lens, to pass the first wavelength range of the received EMR to the at least one first detector array, and to pass the second wavelength range of the received EMR to the at least one second detector array.

According to another aspect of the invention, the at least one first and second detector arrays comprise at least one of a nanoparticle plasmonic detector array, a cadmium mercury telluride detection array, or a bolometer array.

According to another aspect of the invention, the at least one first and second detector arrays have a plurality of detector regions arranged progressively along an axis of the detector arrays, the detector regions arranged to respectively detect EMR imaged from progressively different object distances from the imaging optics.

According to another aspect of the invention, the at least one first and second detector arrays are focal plane arrays, and the processing electronics comprises a back-plane signal processing device.

According to another aspect of the invention, a system comprises a land-based, air-borne, or sea-born vehicle, where the optical system is mounted on the vehicle.

According to another aspect of the invention, the first wavelength range is from about 8 μm to 14 μm.

According to another aspect of the invention, the second wavelength range includes a plurality of 1 μm bandwidth sub-ranges within a range of from about 8 nm to 14 μm.

DETAILED DESCRIPTION

Figure 1:
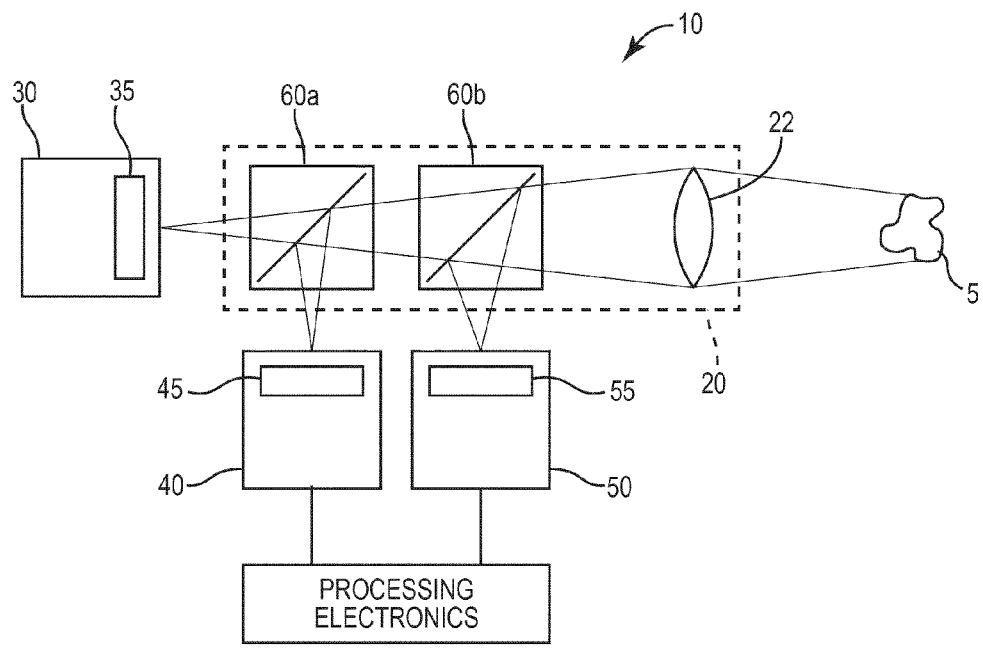
FIG. 1 is a schematic illustrating a thermal imaging system according to an embodiment of the invention.

FIG. 1 illustrates a thermal imaging system 10 for three channel detection of clear air turbulence (CAT), high altitude ice crystals (HAIC) and volcanic ash clouds (VAC). The system 10 includes imaging optics 20, which collects electromagnetic radiation (EMR) from an object 5 of interest. The system 10 further includes a first detection unit 30, a second detection unit 40, and optionally a third detection unit 50. Processing electronics 60 receive detected signals from the first detection unit 30, second detection unit 40, and third detection unit 50.

The imaging optics 20 receives thermal EMR from the object 5 via an EMR collection element 22, such as a lens or mirror. The imaging optics 20 further includes bandpass filters 60 (60a and 60b), which receive EMR from the collection element 22 and pass respective wavelength ranges to the first detection unit 30, second detection unit 40, and third detection unit 50. The bandpass filters 60a and 60b may be spectrally selective mirrors or band pass filters arranged on diagonals of beam splitters, for example. In FIG. 1, the bandpass filter 60b receives EMR radiation and passes a third wavelength range onto at least one third detector array 55 of the third detection unit 50, while passing the remaining EMR to the bandpass filter 60a. The bandpass filter 60a passes a first wavelength range of the received EMR onto at least one first detector array 35 of first detection unit 30, and passes a second wavelength range of the received EMR onto at least one second detector array 45 of second detection unit 40.

In the case that the system 10 does not include the optional third detection unit 50, the system need not include the bandpass filter 60b. The bandpass filter 60a may be a single bandpass filter, or may include a plurality of bandpass filters.

The processing electronics 80 receives a first detected signal from the at least one first detector array 35 and determines whether a first detection event has occurred based on the first detected signal. The processing electronics 80 further receives a second detected signal from the at least one second detector array 45 and determines whether a second detection event and a third detection event have occurred based on the second detected signal. In particular, the first detection event corresponds to detection of CAT, the second detection event corresponds to detection of HAIC, and the third detection event corresponds to detection of VAC.

Figure 2:
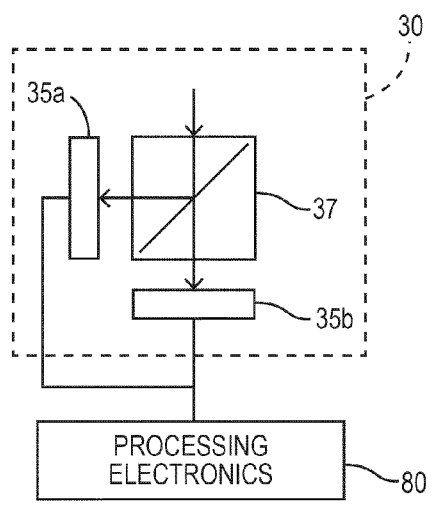
FIG. 2 is a schematic illustrating a first detection unit of the thermal imaging system according to an embodiment of the invention.

FIG. 2 illustrates the first detection unit 30 for detection of CAT according to an embodiment of the invention, where the first detection unit 30 is connected to the processing electronics 80. Exemplary CAT detection units may be found in, for example, U.S. application Ser. No. 13/901,253, entitled PASSIVE CLEAR AIR TURBULENCE DETECTION SYSTEM AND METHOD, filed May 23, 2013, which is incorporated by reference. The first detection unit 30 includes the at least one first detector array 35 (35a and 35b in FIG. 2). While FIG. 2 illustrates the at least one first detector array 35 to be two detector arrays 35a and 35b, the at least one first detector array 35 may be a single detector array, or more than two detector arrays, such as three detector arrays. The first detection unit 30 may include a beam splitter 37 to divide the incoming EMR and direct the EMR onto the two detector arrays 35a and 35b.

Figure 3:
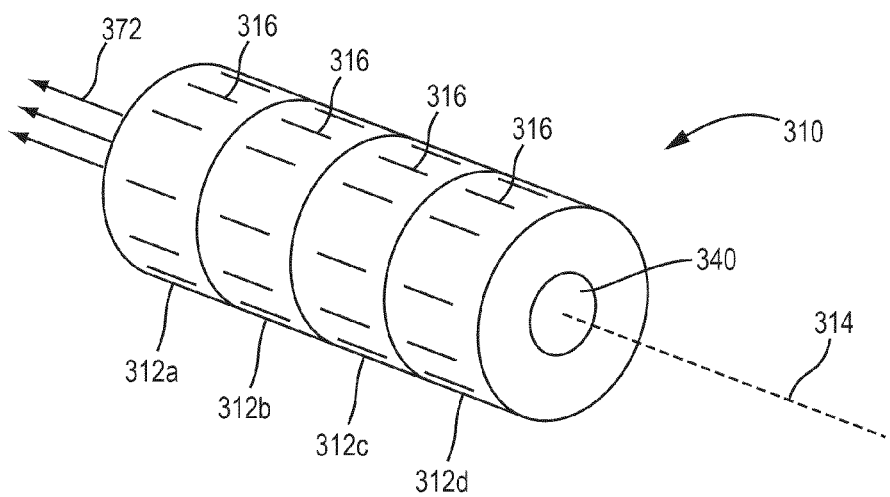
FIG. 3 is a schematic illustrating an axially arranged detector of the thermal imaging system according to an embodiment of the invention.

As seen in FIG. 3, the detector arrays of the least one first detector array 35 for CAT detection may be in the form of an axially arranged EMR detector 310, which provides for range discrimination, according to an embodiment of the invention. Exemplary axially arranged EMR detectors may be found in, for example, U.S. application Ser. No. 13/901,274, entitled PASSIVE RANGE-DISCRIMINATION IN THERMAL AND OTHER IMAGING SYSTEMS, filed May 23, 2013, which is incorporated by reference. The EMR detector 310 is subdivided along its axis 314 into detector regions 312 that correspond to object range intervals. The EMR detector 310 may be hollow having a hole 340 running along the axis 314. The hole may contain wires 372 electrically connecting respectively each detector region 312 to processing electronics (not shown in FIG. 3, but see processing electronics 80 in FIG. 1). In the case that the detector regions 312 comprise a nanoparticle plasmonic detector array, each of the detector regions 312 has a plurality of nanoparticles 316 arranged therein.

Figure 4:
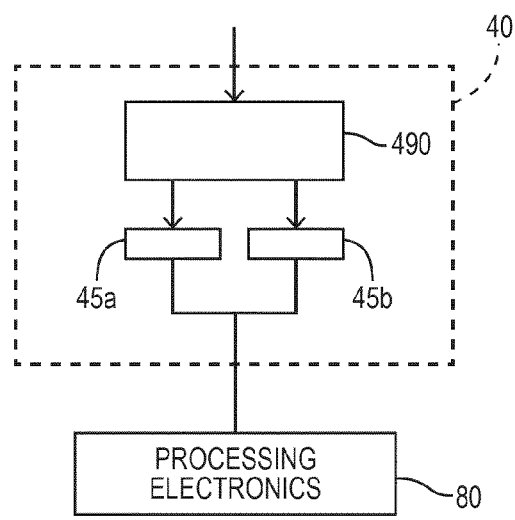
FIG. 4 is a schematic illustrating a second detection unit of the thermal imaging system according to an embodiment of the invention.

FIG. 4 illustrates the second detection unit 40 for detection of VAC and HAIC according to an embodiment, where the second detection unit 40 is connected to the processing electronics 80. The second detection unit 40 includes the at least one second detector array 45 (45a and 45b in FIG. 4). While FIG. 4 illustrates the at least one first detector array 45 to be two detector arrays 45a and 45b, the at least one first detector array 45 may be a single detector array, or more than two detector arrays, such as three detector arrays.

The second detection unit 40 may also include a beam splitter 490 with a bandpass filter to split the EMR entering the second detection unit 40, i.e., the EMR with the second wavelength range from the bandpass filter 60a in FIG. 1, into two or more wavelength bands. Alternatively, the bandpass filter 60a in the imaging optics 20 of the system 10 of FIG. 1 may split the EMR into two or more wavelength bands. Each of the wavelength bands impinges upon a respective detector array of the at least one second detector array 45. For example, if the at least one first detector array 45 is two detector arrays 45a and 45b, as shown in FIG. 4, one wavelength band impinges on the detector arrays 45a, and another different wavelength band impinges on the detector arrays 45b.

Figures 6A, 6B:
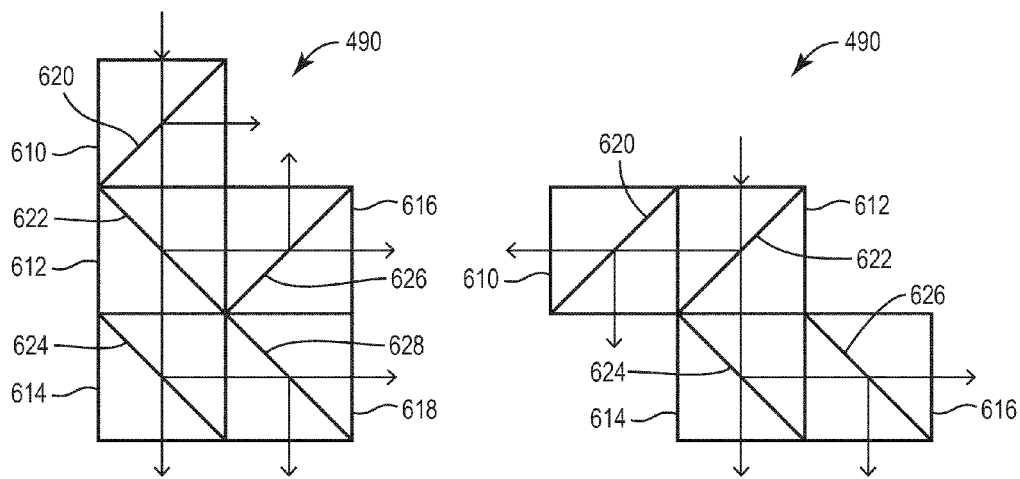
FIGS. 6A and 6B are schematics illustrating exemplary beam splitters of the thermal imaging system according to an embodiment of the invention.

FIGS. 6A and 6B illustrate exemplary beam splitters 490 to split the EMR into 6 beams and 5 beams, respectively. The beam splitter 490 of FIG. 6A has five individual beam splitters 610, 612, 614, 616, and 618, with respective bandpass filters 620, 622, 624, 626, and 628 to split the EMR beam into six wavelength bands, while the beam splitter 490 of FIG. 6B has four individual beam splitters 610, 612, 614 and 616, with respective bandpass filters 620, 622, 624 and 626 to split the EMR beam into five wavelength bands.

As one example for the two wavelength bands for VAC detection, a first wavelength band of EMR may have a bandwidth of 1 µm, and be centered at 10.8 µm, while the second wavelength band of EMR may have a bandwidth of 1 µm, and be centered at 12 µm. Alternatively, the number of bands may be three or more wavelength bands.

Figure 5:
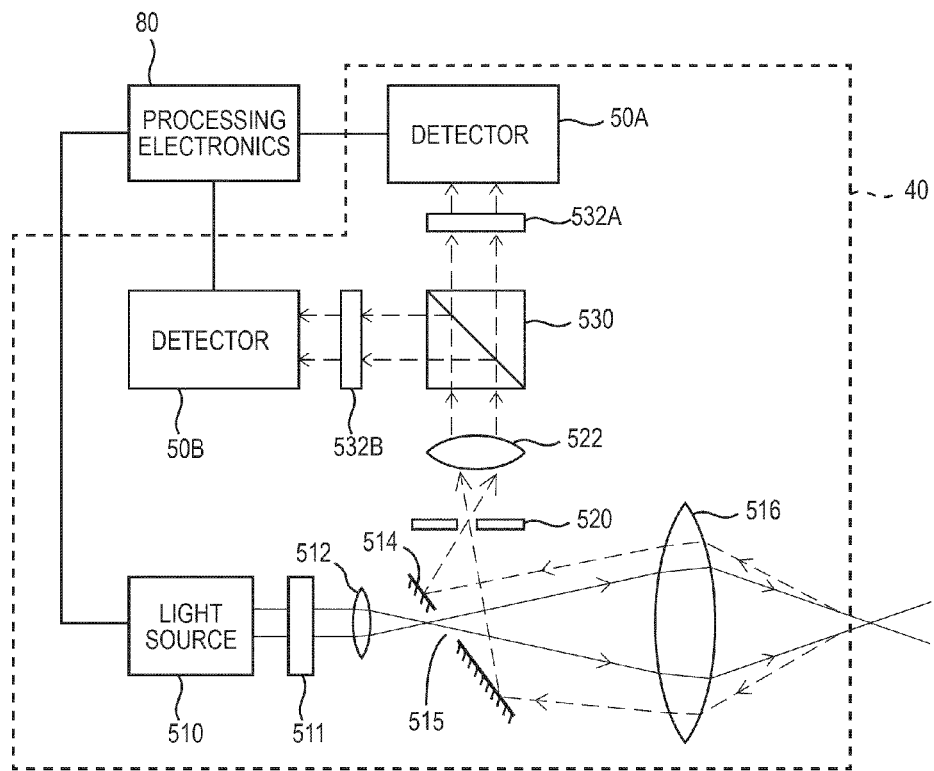
FIG. 5 is a schematic illustrating a third detection unit of the thermal imaging system according to an embodiment of the invention.

FIG. 5 illustrates the third detection unit 40 for detection of HAIC using a Raman detection scheme. Exemplary HAIC detection units may be found in, for example, U.S. application Ser. No. 14/033,202, entitled HIGH ALTITUDE ICE PARTICLE DETECTION METHOD AND SYSTEM, filed Sep. 20, 2013, which is incorporated by reference. The third detection unit 40 includes a laser light source 510 configured to emit laser light, a first lens element 516, and at least one photodetector 50 which may comprise photodetetectors 50A and 50B connected to processing electronics 80.

The laser light source 510, may be a pulsed laser which may be repetitively pulsed at a pulse repetition frequency, or may be a mode-locked laser. The pulsed laser may be a YAG-based laser, such as a Nd:YAG, an Alexandrite laser, or a $CO_2$ laser, for example. A pulsed laser may provide for range gating and range resolution which helps in rejecting close up backscatter from the air just in front of an aircraft, in the case that the third detection unit 40 is mounted on an aircraft. Q-switching of the laser light source 510 may create giant pulses of energy in very short pulses, which may further provide restriction of the observed range, as well as high instantaneous signal-to-noise ratios.

The laser light source 510 may emit pulsed plane polarized light, such as vertical or horizontal polarized, or circularly polarized light, to interrogate both the vertical and horizontal scattering components simultaneously.

The at least one photodetector 50 may be a single detector, or may be two detectors 50A and 50B. The at least one photodetector 50 may be, for example, an Avalanche Photo-Diode (APD), or a nano-plasmonic detector, which provides for even higher responsivity. Light recirculating optics may be provided in front of the detectors to enhance responsivity, if required, allowing multiple bounces of the light off the at least one photodetector 50 to increase the chance of its absorption and detection.

The laser light source 510 may be arranged to direct light to a first lens element 516, which directs the light onto the object 5 in FIG. 1. In this regard, laser light source 510 may be arranged such that light emitted from the laser light source 510 is converged by a lens 512 to an aperture 515 in a mirror 516 and imaged by the first lens element 516 onto the object 5 via the imaging optics 20 in FIG. 1.

The first lens element 516 may be an annular core drilled lens so as to separate light transmitted from the laser light source 510 from the backscattered light received from the object 5, particularly in the case where depolarization detection techniques are used and the polarized and depolarized light scattering returns are received from a cloud to be interrogated. Such an annular core drilled lens may aid in separating a return of the same polarization as the light emitted from the laser light source.

As seen in FIG. 5, the laser light emitted from the laser light source traces a path through the central portion of the first lens element 516, while the return light is collected in an annulus of the first lens element 516 surrounding central portion.

As can be seen in FIG. 5, the backscattered light collected by the first lens element 516 is directed onto the mirror 514, which directs the light through a spatial filter 520 and to the at least one photodetector 50. The spatial filter 520 is arranged to pass the scattered light directed by the first lens element 516 and to reduce background noise light.

HAIC and VAC Detection Based on Brightness Temperature Difference (BTD)

The detection of VAC and HAIC may be performed using a BTD technique. For example, a two band detection scheme may be used, based on the detection by the second detection unit 40 shown in FIG. 1, and the processing electronics 80. Alternatively, the BTD system may use more than two bands, for example, three, four, or five bands, to improved BTD detection performance.

As one example, a two band detection scheme may be used with a first wavelength band of EMR having a bandwidth of 1 µm, and centered at 10.8 µm, while a second wavelength band of EMR may have a bandwidth of 1 µm, and be centered at 12 µm. VAC detection using the 10.8 µm and 12 µm bands is described in, for example, A. J. Prata, 'Observations of Volcanic Ash Clouds in the 10-12 µm window using AVHRR/2 data', Int. J. Remote Sensing, 10, pp 751-761 (1989). The condition for detection of VAC in this case would be $BT_{10.8} - BT_{12.0} < -2°$ K, where $BT_{10.8}$ and $BT_{12.0}$ are the brightness temperature of the thermal EMR detected by the at least one second detector array for the wavelength bands centered at 10.8 µm and 12.0 respectively. Thus the condition for the detection of VAC is set to be a brightness temperature different between the band centered at 10.8 μm and 12 μm being less than −2° K, and the detection of the VAC using BTD is a negative discrimination technique.

By contrast, the condition for detection of ice by BTD is set to be $BT_{10.8}-BT_{12.0}>2°$ K, a positive discrimination technique. In this way, both VAC and HAIC may be detected using the second detection unit 40 and BTD, where negative discrimination provides for detection of VAC, and positive discrimination provides for detection of HAIC.

CAT Detection

CAT is detected using the first detection unit 30, based on a presumed minimum temperature fluctuation in CAT of 2° K. An appropriate wavelength range for detecting CAT is, for example, 8-14 μm. Thus, the first wavelength range could include wavelengths in the range of 8-14 μm, other than those wavelengths used for BTD detection of VAC and HAIC discussed above. CAT detection is discussed, for example, in U.S. application Ser. No. 13/901,253, entitled PASSIVE CLEAR AIR TURBULENCE DETECTION SYSTEM AND METHOD, filed May 23, 2013, which is incorporated by reference, and in U.S. application Ser. No. 13/901,274, entitled PASSIVE RANGE-DISCRIMINATION IN THERMAL AND OTHER IMAGING SYSTEMS, filed May 23, 2013, which is incorporated by reference.

HAIC Detection Based on Raman Scattering

If the system 10 includes the third detection unit 40, HAIC may also be detected based on detection of Raman scattering. Detection of HAIC using Raman scattering is discussed, for example, in U.S. application Ser. No. 14/033, 202, entitled HIGH ALTITUDE ICE PARTICLE DETECTION METHOD AND SYSTEM, filed Sep. 20, 2013, which is incorporated by reference. The confidence factor of predicting the existence of ice particles is enhanced by having two different techniques separately predict the existence of ice-particles.

Detection of ice-particles using Raman scattering allows for discriminating ice from water, by ratios of Raman scattering strength at two different wavelengths, because the Raman spectrum for ice and water are different. For example, ice has a Raman peak at 3140 $cm^{-1}$, which corresponds to a wavelength of 3.185 microns.

The ratio of the Raman strengths for ice at 3140 $cm^{-1}$ and ~3550 $cm^{-1}$ are around 10:1, while the ratio of the Raman strengths for water at 3140 $cm^{-1}$ and ~3550 $cm^{-1}$ is about 1:1. Therefore the existence of ice may be discriminated from the existence of water based on the ratio of the Raman strengths at two wavelengths, for example 3140 $cm^{-1}$ and ~3550 $cm^{-1}$, where a ratio greater than about 1:1 (for wavelengths 3140 $cm^{-1}$ and ~3550 $cm^{-1}$) indicate the existence of ice. In this way the existence of atmospheric ice particles may be based on the ratio of two Raman shifted wavelengths.

Cross Correlation Between Two Detector Arrays

The passive detection system may use correlation techniques to reduce the effects of thermal background noise to allow for detection of CAT at larger distances from the system. Exemplary correlation techniques may be found in, for example, U.S. application Ser. No. 13/901,253, entitled PASSIVE CLEAR AIR TURBULENCE DETECTION SYSTEM AND METHOD, filed May 23, 2013, which is incorporated by reference. The type of correlation techniques may depend on the number of detector arrays employed in the passive system. Returning to FIG. 1, if the at least one first detector array 35 or at least one second detector array 45 comprises a single detector array, the processing electronics 80 may calculate a correlation value based on auto-correlation of the pixels of the single detector array. If the at least one detector array 35 or 45 comprises a plurality of detector arrays, the processing electronics 80 may calculate a correlation value based on multi-correlation of corresponding pixels of the plurality of detector arrays. For example, if the at least one detector array 35 or 45 comprises two detector arrays, the processing electronics 80 may calculate a correlation value based on a cross-correlation of corresponding pixels of the two detector arrays.

An example of a correlation technique for the detector arrays 35 or 45 comprising two detector arrays is now described. Each of the detector arrays of detector arrays 35a and 35b, or 45a and 45b, are arranged to image an overlapping, though not identical region in space.

The correlation coefficient $\rho_{x,y}$ between two random variables X and Y having standard deviations $\sigma_X$ and $\sigma_Y$ is defined as:

$$\rho_{X,Y} = corr(X, Y) = \frac{cov(X, Y)}{\sigma_X \sigma_Y}$$

where corr(X,Y) is the correlation function, nd cov(X,Y) is the covariance function.

For two detector matrix arrays A and B, the covariance of the elements in the m by n arrays A and B is defined as:

$$cvar(A, B) = \frac{1}{mn}\sum_{i=0}^{m-1}\sum_{j=0}^{n-1}[A_{i,j} - mean(A)][\overline{B_{i,j} - mean(B)}]$$

where $A_{i,j}$ and $B_{i,j}$ are the i, jth elements of the arrays A and B, respectively, and the bar indicates complex conjugation, and $$mean(A) = \frac{1}{mn}\sum_{i=0}^{m-1}\sum_{j=0}^{n-1}A_{i,j}$$

The correlation function of the two detector arrays can be calculated by the processing electronics 80 based on the above equation for the covariance of the elements.

For small array sizes, perhaps $100^2$ elements, the correlation value, Corr (A, B), rapidly computes a scalar between 0 (0%) and 1 (100%) as the correlation value; i.e., Pearson's r coefficient.

The processing electronics 80 may then compare the value of the correlation value with a threshold value, which may be between 0.8 and 0.85 for example, and if the correlation value is above the threshold value, the processing electronics indicates that an event has occurred, where the event may be the existence of CAT for the at least one detector array 35, or the existence of VAC or HAIC for the at least one detector array 45.

The processing electronics 80 may calculate the correlation coefficient many times per second with dedicated fast logic (>5 times per second dwell/integration time), to provide a continuous stream of correlation values that could be compared to a threshold level, above which a high probability of CAT (or VAC or HAIC) signals is expected to have been the cause. For example, the processing electronics may calculate the correlation coefficient 1 to 10 times per second.

While a cross-correlation coefficient is calculated for two detector arrays, alternatively the auto-correlation coefficient may be calculated for a single detector array, or a triple-correlation coefficient may be calculated for a three detector array arrangement.

Signal to Noise Ratio for CAT, HAIC and VAC Detection

The signal to noise ratio (SNR) for the CAT, HAIC and VAC detection may be estimated. The irradiance at the image (Watts per square meter) in any optical system can be estimated via the well-known radiometric camera equation:

$$H_i = (\pi N)/\{4(T\#)^2(m+1)^2\}$$

where: m is the magnification in the system; image-size/object-size, N is the object irradiance in Watts $m^{-2}$ $sr^{-1} = (H_s \varphi/\pi$, $H_s$ is the scene irradiance in Watts $m^{-2}$, $\rho$ is the radiant emissivity of the scene, T# is $f/\#/(\text{lens-transmission})^{1/2}$, and f/# is the lens focal length/lens diameter.

From $H_i$, the irradiance at the image in W $m^{-2}$, and the pixel area ($m^2$), the power in Watts incident on that pixel may be calculated. From the Responsivity of the detector-pixel (Amps-per-Watt or Volts-per-Watt) the Signal strength may be calculated from $H_i$—in Amps or Volts.

For a noise-estimate, the usual dominant noise-source for a thermal detector, the Johnson noise is taken. For a given bandwidth $\Delta f$, the root mean square (RMS) of the Noise voltage, $V_n$ is given by: $V_n = (4 k_B T R \Delta f)^{1/2}$. Thus, the RMS of the Noise current, $I_n$ is given by: $I_n = (4 k_B T \Delta f/R)^{1/2}$, where $k_B$ is Boltzmann's constant, T is the absolute Temperature in °K, $\Delta f$ is the bandwidth of the detector/amplifier in Hertz, and R is the detector resistance in Ohms. Thus, the approximate SNR, excluding the background noise-level contribution from the sky or earth, in the pixel can be calculated, as an indication of likely optical system performance integrity.

Estimating SNR for each of the CAT, HAIC and VAC optical detections, is based on the spectral radiance curves for a blackbody. For these calculations it is additionally assumed that the optical system is mounted on an aircraft in flight while the aircraft is flying horizontally, where background noise may derive from the sun, moon, day or night sky, or the earth.

At 10 microns wavelength, the values of background due to sun, daytime sky, night-time sky, full moon, earth and brightest stars are as follows:

| | |
|---|---|
| Sun: | $H(\lambda) \sim 10^{-5}$ Watts per $cm^2$. |
| Daytime Sky: | $N(\lambda) \sim 5 \times 10^{-4}$ Watts per $cm^2$, micron, steradian. |
| Night-time Sky: | $N(\lambda) \sim 0.1 \times 10^{-1}$ Watts per $cm^2$, micron, steradian. |
| Full Moon: | $H(\lambda) \sim 10^{-10}$ Watts per $cm^2$, micron. |
| Earth: | $W(\lambda) \sim 3 \times 10^{-3}$ Watts per $cm^2$, micron. |
| Brightest Stars: | $H(\lambda) \sim 10^{-14}$ Watts per $cm^2$, micron. |

For comparison, three long wavelength infrared (LWIR) detectors are modeled, (1) nanoparticle plasmonic detector (plasmon), (2) Cadmium Mercury Telluride (CMT) and (3) VOX micro-bolometer (VOX). For these calculations, a system is assumed with a 4 inch diameter, f/2 LWIR region (8-14 μm) optical system whose correlated focal plane array (FPA) detectors had Responsivities of ~500 $AW^{-1}$, 120 $AW^{-1}$ and 50 $AW^{-1}$ respectively, each with a system bandwidth of 10 KHz. Lowtran parameters were used for atmospheric calculations. Emissivity for the CAT calculations was set around that for air ~0.2, and for HAIC ice was set at ~0.98 and for VAC ash was set ~0.2, per standard literature reports of approximate values.

For the calculations made here, concentrations of both volcanic-ash particles and ice/water droplets were set well-below the possible danger level (~1 $g/m^3$) to be 0.01 $g/m^3$ with an average particle size ~0.2 mm. Standard light scattering math and particle size distributions were employed to calculate volume-functions and thus signal strengths.

Figure 7A:
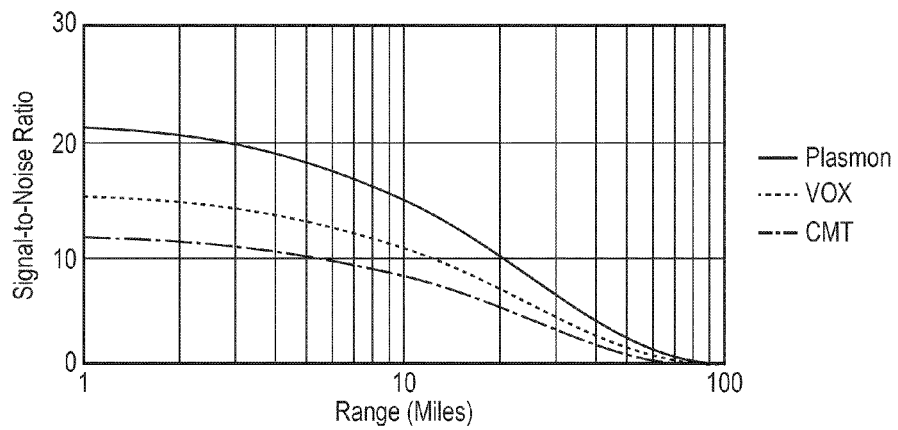
FIGS. 7A, 7B and 7C are graphs illustrating SNR calculated results for plasmon, VOX and CMT detectors for excellent visibility conditions for CAT, HAIC and VAC detection, respectively.
Figure 7B:
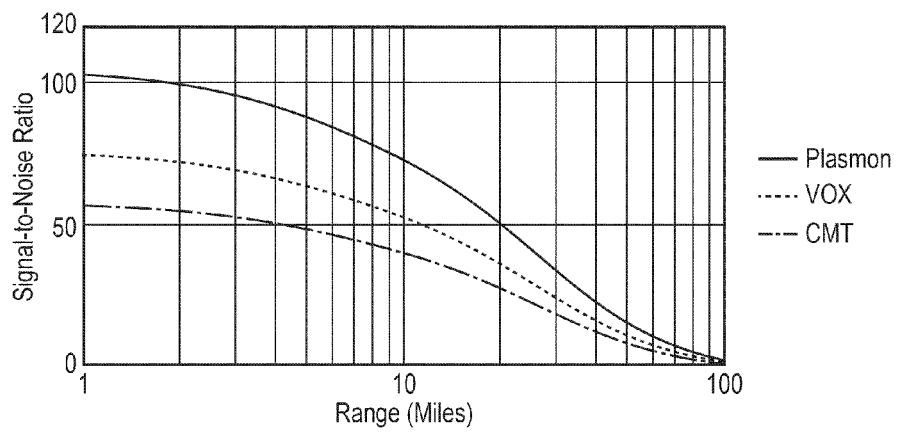
Figure 7C:
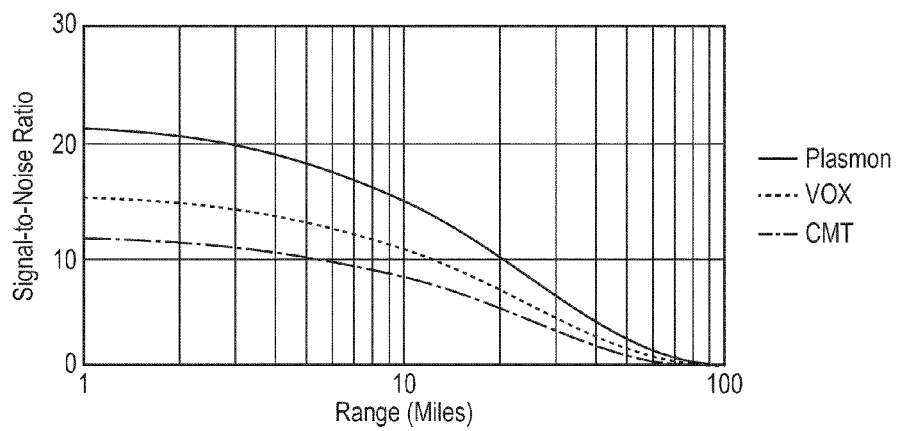

SNR results for excellent visibility conditions, i.e., daylight visibility ranges out to about 100 miles are shown in FIGS. 7A, 7B, and 7C for CAT, HAIC and VAC, respectively, for each of the plasmon, VOX and CMT detectors.

Figure 8A:
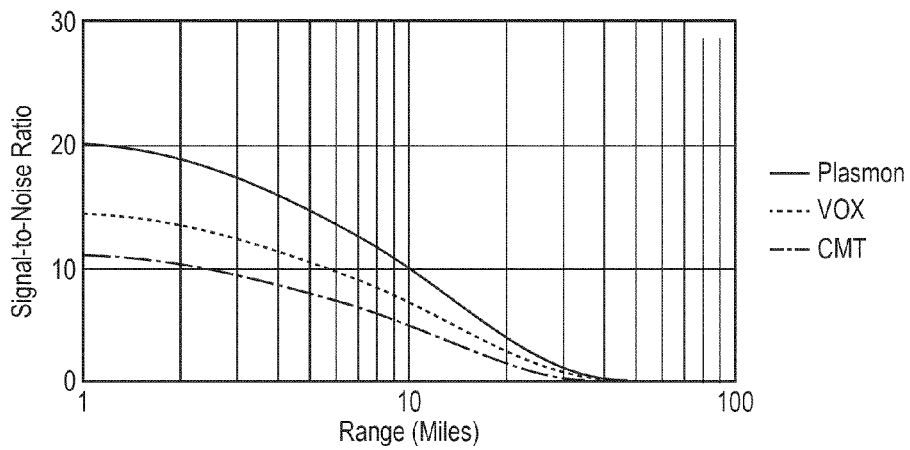
FIGS. 8A, 8B and 8C are graphs illustrating SNR calculated results for plasmon, VOX and CMT detectors for good visibility conditions for CAT, HAIC and VAC detection, respectively.
Figure 8B:
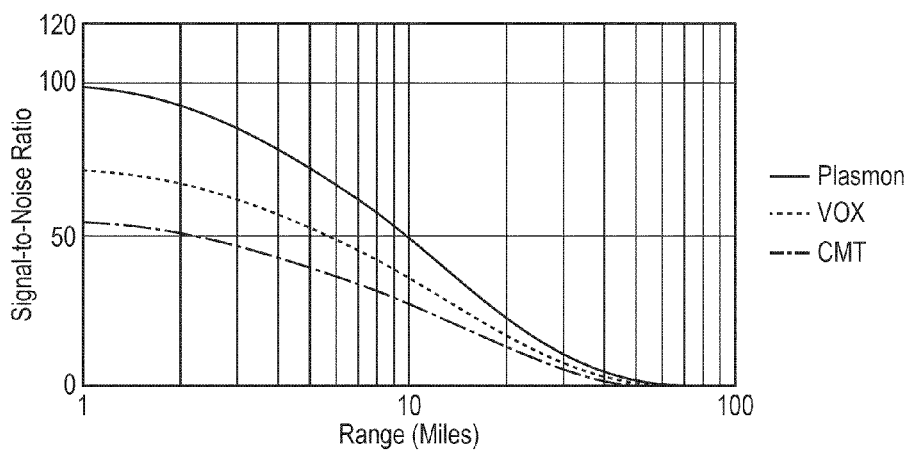
Figure 8C:
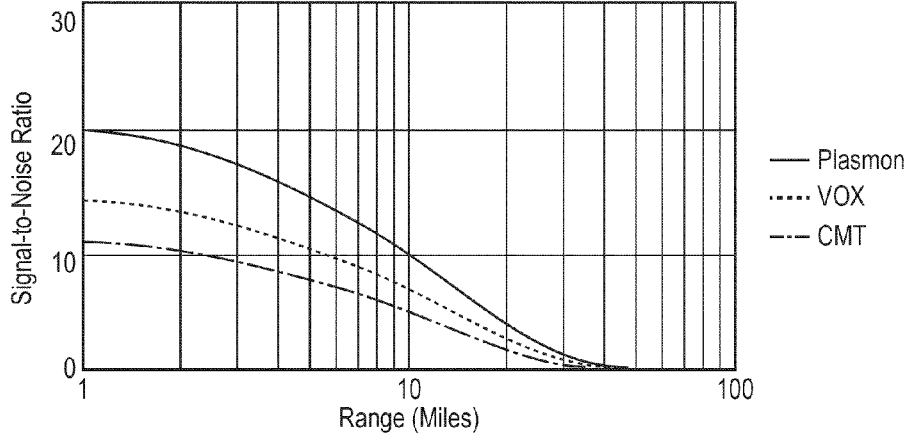

SNR results for good visibility conditions, i.e., daylight visibility ranges out to about 50 miles are shown in FIGS. 8A, 8B, and 8C for CAT, HAIC and VAC, respectively, for each of the plasmon, VOX and CMT detectors.

Figure 9A:
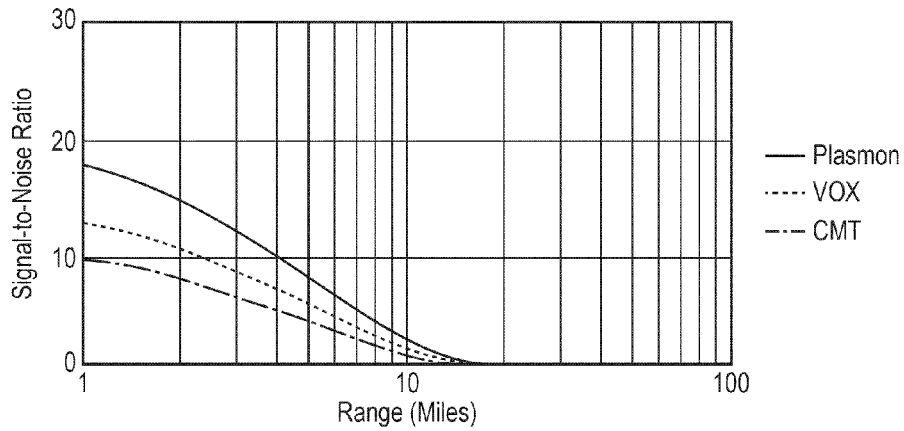
FIGS. 9A, 9B and 9C are graphs illustrating SNR calculated results for plasmon, VOX and CMT detectors for clear visibility conditions for CAT, HAIC and VAC detection, respectively.
Figure 9B:
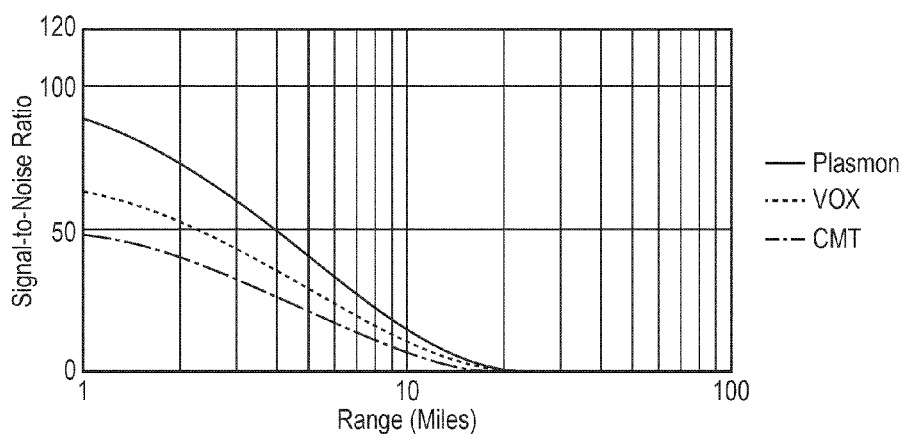
Figure 9C:
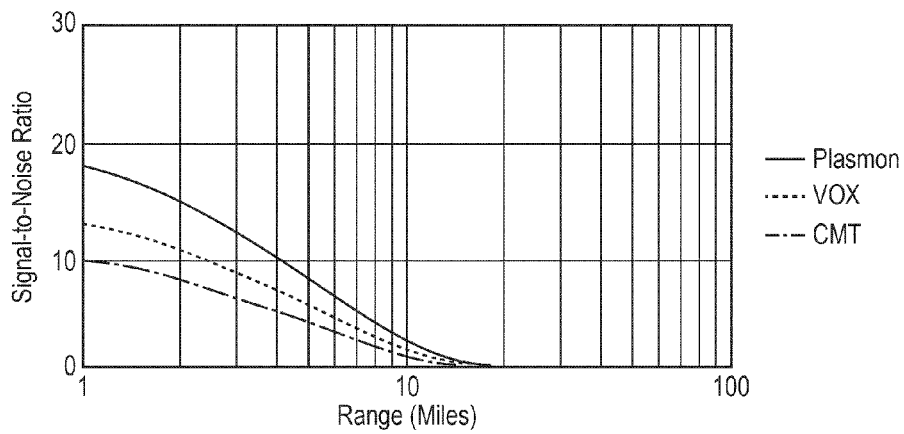

Finally, SNR results for clear visibility conditions, i.e., daylight visibility ranges out to about 20 miles are shown in FIGS. 9A, 9B, and 9C for CAT, HAIC and VAC, respectively, for each of the plasmon, VOX and CMT detectors.

For excellent visibility conditions out to 100 miles, CAT, HAIC and VAC systems might operate out to 30 to 50 miles against a daylight background noise level, providing about 3 to 5 minutes warning for an airplane velocity of 600 mph at cruising altitude.

For very good visibility conditions out to 50 miles, CAT, HAIC and VAC systems might operate out to 20 to 30 miles against a daylight background noise level, providing about 2 to 3 minutes warning for an airplane velocity of 600 mph at cruising altitude.

For good visibility conditions out to 20 miles, CAT, HAIC and VAC systems might operate out to 10 to 20 miles against a daylight background noise level, providing about 1 to 2 minutes warning for an airplane velocity of 600 mph at cruising altitude.

Spatial Cross Correlation Technique for Single Detector Array

The cross correlation technique described above between two different detector arrays may be less sensitive in the case of a significant background signal level. In this case a spatial correlation technique is described for images from a single detector array, where the spatial correlation technique is derived from known temporal photon correlation techniques.

In photon correlation data processing [see, for example, E. Jakeman, E. R. Pike and S. Swain, 'Statistical accuracy in the digital autocorrelation of photon counting fluctuations', J. Phys. A: Gen. Phys., 4, 517 (1971)] the unbiased estimator $\hat{G}$, i.e., the temporal unnormalized second order photon correlation function is provided by: $\hat{G}^{(2)}(\tau) = (1/N) \Sigma n(t+\tau) n(t)$, where t is the time, N is the total number of products constructed with a delay time $\tau$, and n is the instantaneous signal intensity. The Variance, Var, in the correlation function can be written as: $\text{Var}(n(\tau)n(0)) = <n^2(\tau) n^2(0)> - <n(\tau) n(0)>^2$, where the brackets $<\ldots>$ denote the mean value.

In any correlation function measurement the performance can be described in terms of the accuracy with which the correlation coefficient estimator $\hat{G}^{(2)}(\tau)$ can be measured. This is characterized by its relative variance $\text{Var}(\hat{G}^{(2)}(\tau))/<\hat{G}^{(2)}(\tau)>^2$. The variance of $\hat{G}^{(2)}(\tau)$ for a stationary process with no correlations may be written as: $\text{Var}(\hat{G}^{(2)}(\tau)) = (1/N) \text{Var}(n(0)n(\tau))$. Separating the independent variables $n(0)$ and $n(\tau)$ gives:

$$\text{Var}(\hat{G}^{(2)}(\tau)) = (1/N)\{<n^2>^2 - <n>^4\} = (1/N) \{2<n>^3 + <n>^2\}.$$

which is valid for thermal radiation, which has Bose-Einstein statistics of n, because in this case: $<n^2> = <n>^2 + <n>$.

The relative variance is therefore given by: $\text{Var}(\hat{G}^{(2)}(\tau))/<\hat{G}^{(2)}(\tau)>^2 = \{2/(N<n>) + 1/(N<n>^2)\}$ since $\hat{G}^{(2)}(\tau) = <n>^2$.

Figure 10:
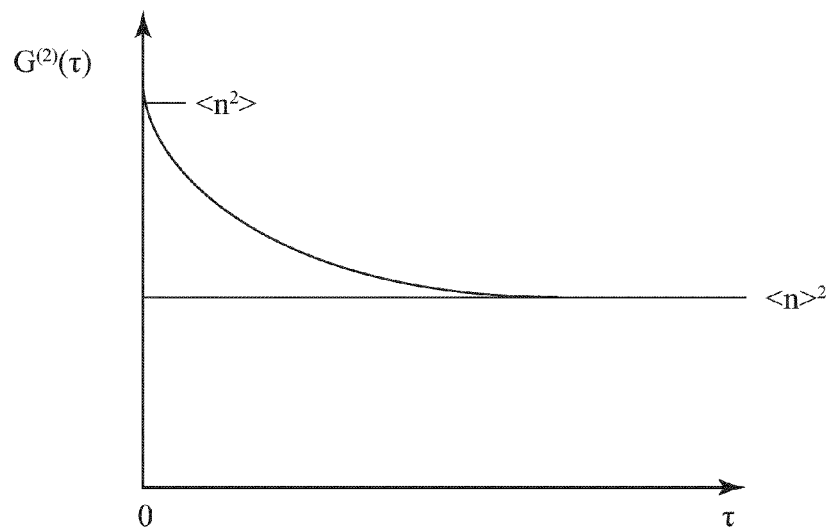
FIG. 10 is a graph illustrating typical behavior of the second order photon correlation function $\hat{G}^{(2)}(\tau)$ as a function of $\tau$.

Given that two consecutive frames are nearly identical, the auto and cross correlation results are closely similar, and using the known properties of the auto-correlation function where the unnormalized intercept correlation coefficient at t=0 is $<n^2>$, while the far point or uncorrelated background correlation value is $<n>^2$, the normalized intercept correlation coefficient is given by: $\{<n^2>/<n>^2\}-1$. FIG. 10 illustrates typical behavior of the second order photon correlation function $\hat{G}^{(2)}(\tau)$ as a function of $\tau$, and showing the intercept correlation coefficient at t=0 is $<n^2>$, and the far point or uncorrelated background correlation value which is $<n>^2$.

The present inventor has realized that Bose-Einstein thermal photon statistical correlation properties spatial detector array correlations be used to, replace $\tau$ by $s_{i,j}$, where $s_{i,j}$ is pixel location across the i by j sized detector array). Thus, the above temporal equations may be used for determining the spatial correlation function and the variance by replacing $\tau$ by $s_{i,j}$.

Thus spatial cross correlation technique provides for rapid and simple image correlation processing. There need only be calculated first order statistics, means or averages, of the intensity or the intensity squared in each pixel, and summations need be formed only over pixel arrays in order to obtain just the essential second order correlation coefficient numbers and ratios used for frame-to-frame picture processing and high-confidence-level, low false-alarm-rate estimates of the presence of CAT, HAIC and/or VAC in the images.

The SNR may be further reduced by summation coefficients from multiple images. For example, M coefficients from M images will yield an extra $(M)^{0.5}$ in signal-to-noise-ratio on the estimator. Moreover, an increase in SNR will reduce false alarms, i.e., the false determination of an event such as CAT, VAC or HAIC detection. For example, the false-alarm rates may be substantially reduced if M >100. In the case of M=100, the false alarm rates may be reduce by a factor of ten.

The normalized correlation value, relative variance, and standard deviation was calculated for three detector array images using a long-wavelength IR micro-bolometer camera, where the array images were a detector background noise image, static high background level image, and an image of a real object. The images were 640 by 512 pixels in size. In the calculations, using the above math, $\tau$ was replaced by $s_{i,j}$ where i=640 and j=512. Thus there were N=640*512 pixel product calculations per frame pair.

The calculation results were as follows. The normalized correlation value for the pair of noise images of the detector background noise image was ~$5.6 \times 10^{-4}$. The relative variance of a single frame-pair was $2.83 \times 10^{-8}$, and thus the standard deviation, was ~$1.7 \times 10^{-4}$. The normalized correlation value for the static high background level image was ~$2.7 \times 10^{-4}$. The relative variance of a single frame-pair was $5.34 \times 10^{-8}$, thus the standard deviation was ~$2.3 \times 10^{-4}$. The normalized correlation value for the pair of images of the real object image was ~$5.9 \times 10^{-2}$. The relative variance of a single frame-pair was $4.10 \times 10^{-8}$, thus the standard deviation was ~$2.0 \times 10^{-4}$. Thus, the detector background noise and static high background level cases show intercept correlation values approximately two orders of magnitude less than the pictures containing correlated structure, i.e., the real object image.

Figure 11:
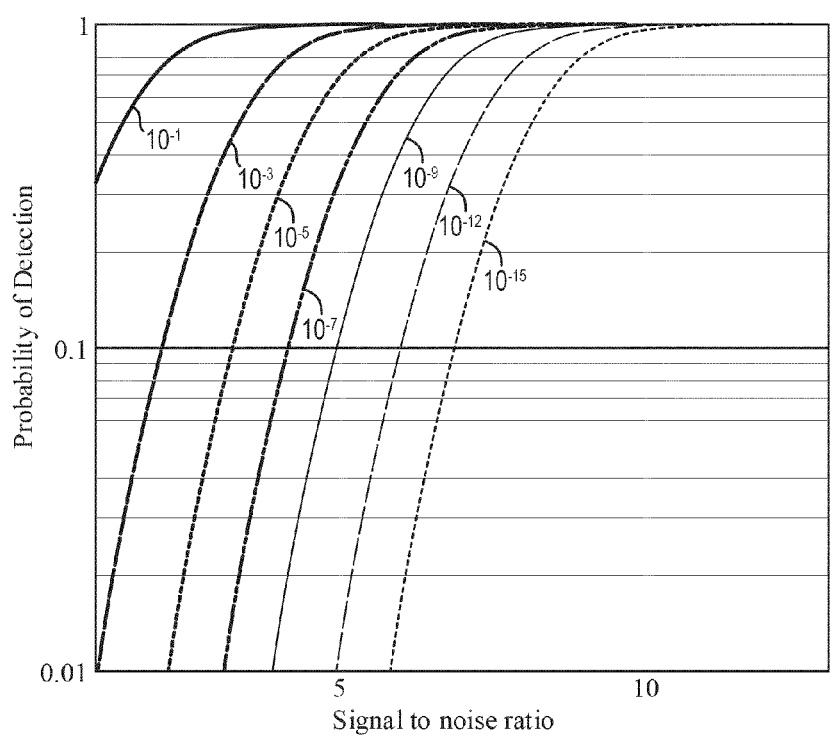
FIG. 11 is a graph illustrating the probability of detection of CAT, HAIC or VAC as a function of SNR for correlated signal FAR values.

A low false alarm rate (FAR) for detecting CAT, HAIC and VAC is important for reducing unwanted false alarm detections. FIG. 11 illustrates a calculated probability of detection of CAT, HAIC or VAC as a function of SNR for correlated signal FAR values of $10^{-1}$, $10^{-3}$, $10^{-5}$, $10^{-7}$, $10^{-9}$, $10^{-12}$, and $10^{-15}$. Presuming that the detection is performed for an aircraft during a typical transatlantic flight, a FAR of less than about $10^{-6}$ should be satisfied. In order to satisfy a FAR of less than about $10^{-6}$, a SNR of greater than about 7 is desired.

The embodiments of the invention have been described in detail with particular reference to preferred embodiments thereof, but it will be understood by those skilled in the art that variations and modifications can be effected within the spirit and scope of the invention.

What is claimed is:

1. A passive thermal imaging system, comprising:
   a first detection unit comprising at least one first detector array configured to detect thermal electromagnetic radiation (EMR);
   a second detection unit comprising at least one second detector array configured to detect thermal EMR;
   imaging optics configured to receive thermal EMR from an object, to pass a first wavelength range of the received thermal EMR, to image the first wavelength range of the received EMR onto the at least one first detector array, to pass a second wavelength range of the received thermal EMR, and to image the second wavelength range of the received EMR onto the at least one second detector array; and
   processing electronics configured to:
      receive a first detected signal from the at least one first detector array and to determine whether a first detection event has occurred based on the first detected signal; and
      to receive a second detected signal from the at least one second detector array and to determine whether a second detection event and a third detection event have occurred based on the second detected signal,
      wherein the first detection event corresponds to detection of clear air turbulence (CAT), the second detection event corresponds to detection of high altitude ice crystals (HAIC), and third detection event corresponds to detection of volcanic ash clouds (VAC).

2. The system of claim 1, wherein the processing electronics is configured to determine whether a respective one of the detection events has occurred based on determining a cross correlation of a respective one of the detected signals.

3. The system of claim 2, wherein determining the cross correlation comprises determining an intercept and a variance of a correlation coefficient.

4. The system of claim 2, wherein the processing electronics is configured to determine whether a respective one of the detection events has occurred, based on averaging a sequence of a respective one of the detected signals to reduce a false alarm rate of detecting the respective one of the detection events.

5. The system of claim 1, wherein a false alarm rate of detecting the first, second and third detection events is less than about $10^{-6}$.

6. The system of claim 1, wherein the system is configured to detect one of the detection events at an object range of up to about 200 miles.

7. The system of claim 1, wherein at least one of the first, second and third detection events includes detection of weather events including at least one of high winds, tornados, clouds, rain, hail, snow, or other precipitation.

8. The system of claim 1, wherein the processing electronics is configured to determine whether the second detection event has occurred based on negative discrimination of brightness temperature difference (BTD) of the second detected signal.

9. The system of claim 1, wherein the processing electronics is configured to determine whether the third detection event has occurred based on positive discrimination of brightness temperature difference (BTD) of the second detected signal.

10. The system of claim 1, wherein the imaging optics include a first bandpass filter arranged to pass the first wavelength range of the received EMR.

11. The system of claim 1, further comprising:
a third detection unit comprising:
a laser arranged to provide laser light to the object; and
at least one third detector array arranged to receive scattered laser light from the object.

12. The system of claim 1, wherein the imaging optics includes spectrally selective mirrors arranged to receive the thermal EMR form the imaging lens, to pass the first wavelength range of the received EMR to the at least one first detector array, and to pass the second wavelength range of the received EMR to the at least one second detector array.

13. The system of claim 1, wherein the at least one first and second detector arrays comprise at least one of a nanoparticle plasmonic detector array, a cadmium mercury telluride detection array, or a bolometer array.

14. The system of claim 1, wherein the at least one first and second detector arrays have a plurality of detector regions arranged progressively along an axis of the detector arrays, the detector regions arranged to respectively detect EMR imaged from progressively different object distances from the imaging optics.

15. The system of claim 1, wherein the at least one first and second detector arrays are focal plane arrays, and the processing electronics comprises a back-plane signal processing device.

16. A system comprising a land-based, air-borne, or sea-born vehicle, where the system of claim 1 is mounted on the vehicle.

17. The system of claim 1, wherein the first wavelength range is from 8 μm to 14 μm.

18. The system of claim 1, wherein the second wavelength range includes a plurality of 1 μm bandwidth sub-ranges within a range of from about 8 μm to 14 μm.

19. A passive thermal imaging system, comprising:
a first detection unit comprising at least one first detector array configured to detect thermal electromagnetic radiation (EMR);
a second detection unit comprising at least one second detector array configured to detect thermal EMR;
imaging optics configured to receive thermal EMR from an object, to pass a first wavelength range of the received thermal EMR, to image the first wavelength range of the received EMR onto the at least one first detector array, to pass a second wavelength range of the received thermal EMR, and to image the second wavelength range of the received EMR onto the at least one second detector array; and
processing electronics configured to:
receive a first detected signal from the at least one first detector array and to determine whether a first detection event has occurred based on the first detected signal; and
to receive a second detected signal from the at least one second detector array and to determine whether a second detection event and a third detection event have occurred based on the second detected signal,
wherein the first detection event corresponds to detection of clear air turbulence (CAT), the second detection event corresponds to detection of high altitude ice crystals (HAIC), and third detection event corresponds to detection of volcanic ash clouds (VAC),
wherein the processing electronics is configured to determine whether the third event has occurred based on two different light scattering detection techniques, the two different light scattering detection techniques include the determination of the existence of HAIC based on the ratio of two Raman shifted wavelengths, and the determination of the existence of HAIC based on positive discrimination of brightness temperature difference (BTD).

* * * * *